Patented Sept. 13, 1949

2,481,875

UNITED STATES PATENT OFFICE 2,481,875

METHOD OF PRODUCING A STABLE FOAM GENERATING COMPOSITION

Arthur Ferdinand Ratzer, Brentford, England, assignor to The Pyrene Company Limited, Brentford, England, a British company No Drawing. Application December 8, 1945, Serial No. 633,865. In Great Britain January 1, 1945

5 Claims. (Cl. 252—352)

This invention relates to a method of making foam generating compositions and particularly such compositions which are suitable for use for fire extinguishing purposes.

A primary object of the present invention has been to provide a foam generating composition which is stable at high temperature and in the presence of air over long periods of time and which will not develop an objectionable precipitate or sediment when stored in open containers or in either open or closed containers under elevated temperature conditions.

Foam generating compositions of the type used for fire extinguishing purposes may be made by the controlled degradation or hydrolysis of proteins. Methods of this character which have proved very successful are disclosed in my Patent No. 2,324,951, granted July 20, 1943, and in the patent to Tresise and Ratzer No. 2,368,623, granted February 6, 1945. In accordance with the methods disclosed in these patents an alkaline earth metal oxide or hydroxide or magnesium oxide or hydroxide is used as a hydrolyzing agent. Such hydrolyzing agents are desirable because of the comparative ease with which the reaction may be controlled and arrested at the desired point. This is important since the degradation of proteins involves splitting of the molecules at the amino acid linkages and as the degradation proceeds the hydrolysate becomes a mixture of fractions of different molecular weights. The hydrolysis must be stopped when an optimum stage has been reached since if it were permitted to continue to completion the proteins would all be converted to simple amino acids. When the hydrolysis is stopped, not all of the original molecules have reached the optimum degree of degradation. Some will have been carried beyond the desired point, while others will not have reached it and the hydrolysis must be stopped when the greatest percentage of the molecules have been degraded to just the desired extent. At this time the product still contains heavy molecular fractions which are apparently rather readily available for further degradation under conditions favorable for hydrolysis.

Whatever method is used for the hydrolysis of the original proteinous material, it is desirable to add to the product an agent which serves to stabilize the foam produced from it. Ferrous sulfate was invariably used for this purpose for a long time but, as explained in the Tresise and Ratzer patent above mentioned, it is particularly advantageous to use ferrous chloride for this purpose when the hydrolyzing agents mentioned in my prior Patent No. 2,324,951 are used. In general, it may be said that a number of heavy metal salts may be used for stabilization purposes and iron salts are especially effective. Apparently these salts perform their stabilizing function by forming with the degraded protein a reaction product which is precipitated, with or without oxidation, when the foam is formed, so that solid matter is lodged in the walls of the foam bubbles and thereby causes the resultant foam to be more stable.

Protein degradation products to which a stabilizing agent has been added, as indicated above, are quite satisfactory even though stored for long periods of time, if they are stored in sealed containers and maintained constantly at normal temperatures. However, there is a tendency for a precipitate to form when these products are stored in open tanks or are otherwise kept under conditions in which the products are accessible to air or other source of oxygen, or if they are subjected to high temperatures, above say about 90° F., whether they are kept in sealed or open containers. Such precipitation may take place a considerable time after the product has been made, i. e., whenever it is exposed to the conditions inducing precipitation. For some purposes, however, it is desirable, or even necessary, to store the product in open containers, in bulk or otherwise, and, of course, products intended for export must be stable at relatively high temperatures above, say, 90° F.

While I do not wish to be limited to this explanation or theory, the formation of the precipitate is probably due to a reaction between the heavy molecular fractions of the hydrolysate, i. e., those which have not been degraded to the optimum extent as above mentioned, with the heavy metal of the stabilizing agent in the presence of air or other source of oxygen, or at elevated temperatures even in the absence of air or oxygen. This formation of a precipitate in the product may be regarded as a premature and partial occurrence of the reaction which is desired in the ultimate foam production.

According to the present invention the stabilizing agent is incorporated in the protein hydrolysate at a stage in the course of manufacture of the foam generating compound at which such premature reactions may proceed without objection because of the subsequent removal of the reaction products. As a result of this procedure there is no precipitate left in the final product and the latter has no substantial tendency to form a precipitate under the adverse storage conditions mentioned, since the precipitate forming reactions which would have taken place under these conditions have been previously carried out. The reaction between the stabilizing agent and the heavy molecular fractions (or possibly the light molecular fractions) to form a precipitate in the course of manufacture of the foam generating compound proceeds only slowly in the cold. To take advantage of this fact the stabilizing agent is preferably added during, or just before, a heating stage employed in the manufacture of the desired compound although naturally the mixture of the mass and the stabilizing agent may be specially heated to a temperature above 90° F. to cause the reactions to proceed. Since the hydrolysate should be rendered neutral before the addition of the stabilizing agent, to prevent reaction between such agent and the hydrolyzing agent, the stabilizing agent is preferably added after the neutralization step and before the concentration step, in a process conducted in accordance with the Tresise and Ratzer patent above mentioned, so that the precipitation takes place during the concentration step. If the protein is keratin, the addition of the stabilizing agent at this stage has the further advantage that sulphides present in the hydrolysate are also removed in the neutralization and thus are prevented from reacting with the stabilizing agent.

In general the invention is applicable to any process in which heavy-metal salts are mixed with protein degradation products to act as stabilizing agents. If the degradation is effected by acid or caustic alkali instead of lime or the like, neutralization is still an essential step in the process of manufacture and the heavy-metal salt may most conveniently be added after the neutralization of the hydrolyzed product.

In the production of foam generating compositions from proteins filtration is usually resorted to and, in fact, when the method disclosed in the above mentioned Tresise and Ratzer patent is employed, it has been found desirable to filter the reaction products twice, once after the neutralization step and before the concentration step. In practicing the present invention it is preferable to carry out the second filtration after the concentration step. During this second filtration the products of the reaction with the stabilizing agent are removed. By thus postponing the second filtration step there is obtained the advantage that the premature reaction with the stabilizing agent may proceed substantially to completion before the second filtration is performed.

Naturally the fact that some of the stabilizing agent is in effect deliberately caused to react with some of the constituents of the hydrolyzed product results in a diminution of the amount of stabilizing agent available in the final material for stabilizing purposes. Accordingly in carrying out the invention I add more stabilizing agent than I should do in proceeding exactly as described in the Tresise and Ratzer patent above mentioned, so as to leave an adequate amount of stabilizing agent in the final product. As a specific example of the conduct of the improved method, hoof and horn meal may be subjected to hydrolysis with an agent such as lime and the resulting products may be filtered with either simultaneous or subsequent neutralization by the addition of hydrochloric acid. The hydrolysate may then be boiled and a solution of sodium chloride may be added and then the stabilizing agent, preferably a solution of ferrous chloride, may be added. The mass is then re-neutralized with caustic soda, boiled say for half an hour, while being agitated continuously and concentrated, and filtered while at the boil. The concentrated and filtered product is then ready for storage in either open or sealed containers and will be found to be substantially free from any tendency to produce an objectionable precipitate or sediment. As an indication of appropriate quantities, times and temperatures, 2500 lbs. of hoof and horn meal may be mixed with 900 lbs. of slaked lime and 800 gallons of water and heated and maintained for 6 hours at 98° C. The product is filtered, the filtrate neutralized with hydrochloric acid and the mixture boiled to drive off undesirable gases. Whilst it is still boiling a stabilizing agent in the form of a solution containing 3½ lbs. of crystalline ferrous chloride per gallon of solution is added, the amount of this solution used being 10% of the volume which the filtrate would occupy at 30° Twad. After boiling for 15 minutes, the mixture is neutralized with caustic soda, concentrated to 30° Twad., filtered whilst hot and cooled. Of the amount of ferrous chloride used in this example 1 lb. per gallon is provided to react with constituents of the hydrolyzed product, 2½ lbs. per gallon being enough for the purpose of foam stabilization.

In connection with the foregoing, it will be understood that while certain specific hydrolyzing and stabilizing agents, as well as other constituents, have been specified, it will be understood that other agents commonly employed in the art for the same purposes may be substituted. Other variations may be made in the process and in the resulting product without departing from the general principles and scope of the invention. The proteinous material treated in accordance with the invention may be any of the types commonly employed for the purposes as set forth in the Ratzer and Tresise and Ratzer patents hereinabove mentioned, including any of the class consisting of keratins, albumens, globulins, hemoglobins, and seed meal proteins.

I claim:

1. A method of producing a stable foam generating composition which comprises hydrolyzing proteinous material selected from the class consisting of keratins, albumens, globulins, hemoglobins, and seed meal proteins by the action of an alkaline agent selected from the group consisting of oxides and hydroxides of the alkaline earth metals and magnesium, adding thereto a foam stabilizing agent capable of reacting with some of the hydrolysate at elevated temperatures to form an insoluble precipitate, said stabilizing agent being a heavy metal salt capable of reacting with protein to form a soluble complex which when aerated or oxidized forms an insoluble complex, subjecting the mixture to a temperature above 90° F. after the addition of said stabilizing agent and thereby causing a partial reaction between said hydrolysate and said stabilizing agent, and removing the resulting precipitate.

2. A method of producing a stable foam generating composition which comprises hydrolyzing proteinous material selected from the class consisting of keratins, albumens, globulins, hemoglobins, and seed meal proteins, adding thereto a foam stabilizing soluble ferrous salt capable of reacting with some of the hydrolysate at elevated temperatures to form an insoluble precipitate, subjecting the mixture to a temperature above 90° F. and causing a partial reaction between said hydrolysate and said stabilizing salt, and removing the resulting precipitate.

3. A method of producing a stable foam generating composition which comprises hydrolyzing proteinous material selected from the class consisting of keratins, albumens, globulins, hemoglobins, and seed meal proteins by the action of an alkaline agent selected from the group consisting of oxides and hydroxides of the alkaline earth metals and magnesium, adding an acid to neutralize the hydrolysate, then adding thereto a foam stabilizing agent capable for reacting with some of the hydrolysate at elevated temperatures to form an insoluble precipitate, said stabilizing agent being a heavy metal salt capable of reacting with protein to form a soluble complex which when aerated or oxidized forms an insoluble complex, subjecting the mixture to a temperature above 90° F. and causing a partial reaction between said hydrolysate and said stabilizing agent, and removing the resulting precipitate.

4. A method of producing a stable foam generating composition which comprises hydrolyzing proteinous material selected from the class consisting of keratins, albumens, globulins, hemoglobins, and seed meal proteins by the action of an alkaline agent selected from the group consisting of oxides and hydroxides of the alkaline earth metals and magnesium, adding an acid to neutralize the hydrolysate, then adding thereto a foam stabilizing agent capable of reacting with some of the hydrolysate at elevated temperatures to form an insoluble precipitate, said stabilizing agent being a heavy metal salt capable of reacting with protein to form a soluble complex which when aerated or oxidized forms an insoluble complex, re-neutralizing the mass by the addition thereto of an alkaline agent, boiling the mass to concentrate the same and thereby causing a partial reaction between said hydrolysate and said stabilizing agent, and removing the resulting precipitate.

5. A process for the manufacture of a foam generating substance which comprises hydrolyzing proteinous material selected from the class consisting of keratins, albumens, globulins, hemoglobins, and seed meal proteins, adding thereto a heavy metal salt which is a foam stabilizing agent capable of reaction with some of the hydrolysate at elevated temperatures to form a soluble complex which when aerated or oxidized forms an insoluble precipitate, said salt being added at a stage in the process subsequent to the hydrolyzing step but prior to the completion of the process so that reactions between the salt and constituents of the hydrolysate may proceed, supplying heat to one or more of the reacting substances in the course of the foregoing steps so that the reaction between the salt and constituents of the hydrolysate will be accelerated by the heat, and removing the insoluble reaction products.

ARTHUR FERDINAND RATZER.

REFERENCES CITED

The following references are of record in the file of this patent:

UNITED STATES PATENTS

| Number | Name | Date |
| --- | --- | --- |
| 2,212,470 | Friedrich | Aug. 20, 1940 |
| 2,324,951 | Ratzer | July 20, 1943 |
| 2,368,623 | Tresise et al. | Feb. 6, 1945 |
| 2,391,559 | Faulkner | Dec. 25, 1945 |

OTHER REFERENCES

Hackh's Chemical Dictionary (Grant), 1944, pages 689 and 690.

"Chemistry of the Amino-Acids and Proteins," Schmidt (1938), pages 176, 177, 178 and 927 to 948.